Sept. 7, 1954  C. S. SALTARELLI  2,688,741
VISUAL SELECTIVE DIRECTORY
Filed March 1, 1950
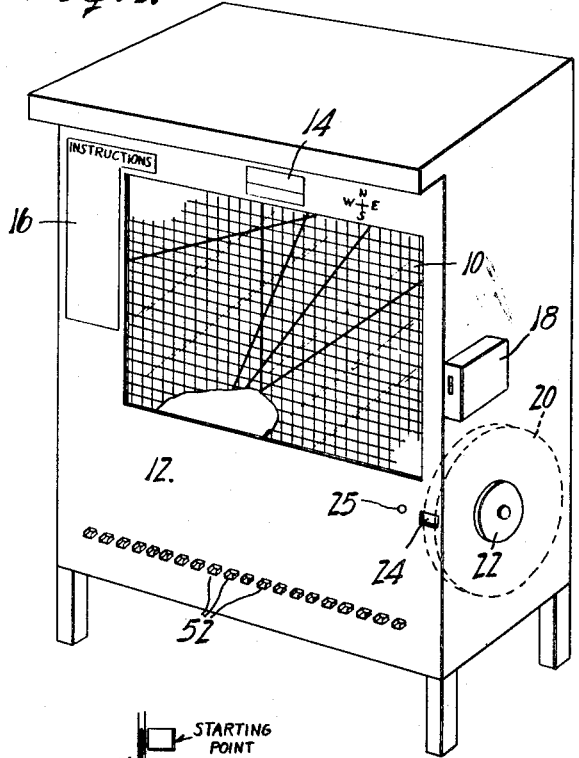
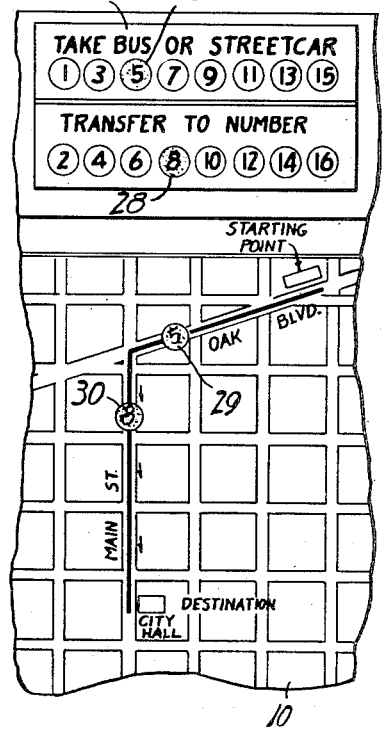
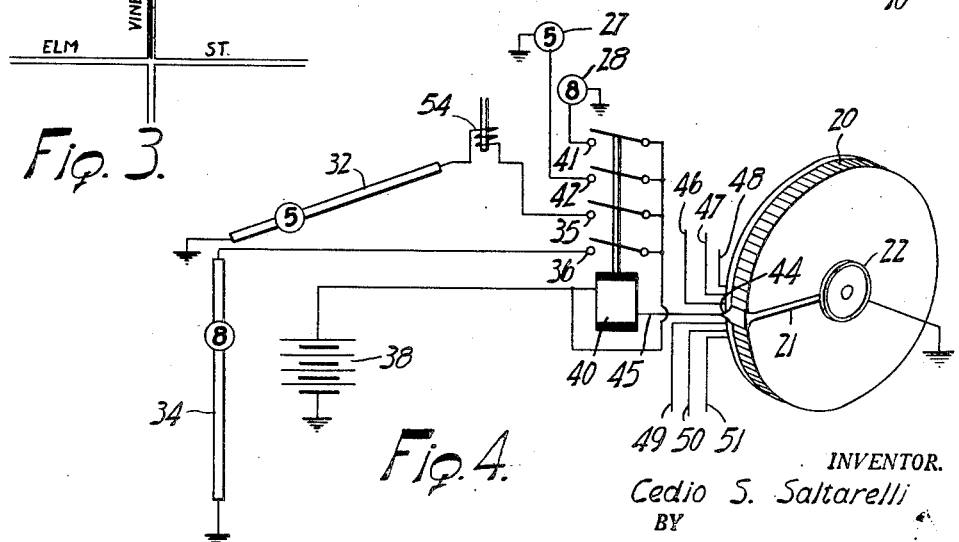
INVENTOR.
Cedio S. Saltarelli
BY
Bean, Brooks, Buckley & Bean
ATTORNEYS

Patented Sept. 7, 1954

2,688,741

UNITED STATES PATENT OFFICE 2,688,741

VISUAL SELECTIVE DIRECTORY

Cedio S. Saltarelli, Buffalo, N. Y.

Application March 1, 1950, Serial No. 146,980

3 Claims. (Cl. 340—225)

This invention relates to geographical guides or directory devices, and more particularly to an improved device for that purpose which includes a map of any desired area such as a city, town, county, etc., with means for visually indicating upon such map the situs thereof and the routes and transportation facilities for traveling therefrom to any desired location represented on the same map.

One of the objects of the invention is to provide a device of the character described which not only selectively illuminates the geographical position of an intended destination, but also the best automobile and public utility routes thereto; as well as designations of the proper street cars or buses to be used in order to travel from the point at which the device is installed to the intended destination.

Another object of the invention is to provide a directory device of the character described which will provide the improved directory service referred to hereinabove while being at the same time structurally simple and relatively inexpensive to manufacture and maintain.

Other objects and advantages of the invention will appear in the specification hereinafter.

In the drawing:

Fig. 1 is a perspective view of one possible physical exemplification of a device of the invention;

Fig. 2 is a fragmentary close-up view, on an enlarged scale, of a portion of the front panel structure thereof;

Fig. 3 is another fragmentary illustration, as of a typical portion of the front panel of the device illustrating another facility of the mechanism; and Fig. 4 is a diagrammatic illustration of a portion of the control mechanism and of a typical wiring circuit thereof.

The invention is illustrated in the drawing herewith, which is intended to represent only one possible physical embodiment thereof. In any event, the invention contemplates provision of a map device printed or painted or otherwise inscribed upon a transparent surface formed of glass or plastic or other suitable material; and as illustrated in Fig. 1 of the drawing, the map surface which is designated generally at 10 may be conveniently mounted to comprise a portion of the front panel of a cabinet 12 arranged to also house the operative mechanism which will be explained hereinafter. Thus, the device may be conveniently set up at any appropriate place, such as in a railroad station, a steam ship terminal, an automobile service station, or the like; to make readily available for travelers appropriate information as to the location of the best route to any desired destination such as within the city at which the traveler has just arrived. Also, the device will simultaneously furnish information as to the proper street car or bus or train to take from the point at which the traveler now stands in order to get to the desired destination. The directory mechanism of the invention may be arranged either to furnish such information gratis, or to be coin-operated so as to be a self-supporting or profitable investment.

Thus, as illustrated in the drawing, in addition to the map surface 10, the device may typically include an indicating panel 14 wherein information as to the proper street car or bus connections to be taken to gain a desired destination will be indicated, as will be explained hereinafter. Also, a destination index panel as indicated at 16 may be furnished to assist the user in the operation of the mechanism as will be explained hereinafter; and a coin deposit device may be mounted on the cabinet as indicated at 18.

The control mechanism for the directory device of the invention includes some suitable indexing mechanism, such as for example an index wheel or rim as is indicated at 20. As shown in greater detail in Fig. 4 the index wheel 20 will carry at its periphery printed indicia corresponding to different destinations available for selection by the user. For example, the indicia strip on the wheel 20 may include alphabetically arranged names of various points of interest or utility or city streets or the like in the area covered by the map; such as the city hall, the names of the various hotels, railroad stations, and other like points. Or, in the alternative the wheel 20 may be marked at its periphery with a sequence of numerals or other suitable indicia corresponding to names or titles set forth on the index sheet 16, with the corresponding numeral or indicia set opposite to each name or title. Thus, in either case, the operator will consult the index device to locate thereon the name of the place to which he wants to go, and will then turn the index wheel rim 20 which is carried by a brush finger 21, as by the hand knob 22, until the proper index member appears in the window 24.

Then he may control the device so as to obtain illumination of the route from the point of his present location to the point of his desired destination as well as the appropriate information concerning the proper transportation facilities to employ, by pressing a control button 25; having first inserted a suitable coin in the receiver 18. The mechanism interiorly of the cabinet 12 will then operate, for example as illustrated in Fig. 2, to illuminate the proper street route for traveling from the point of the present location to the desired destination, as well as the proper street car or bus numbers to be taken in order to make the proposed trip in the best possible manner. Thus, as illustrated in Fig. 2, portions of the proper streets to be followed will be illuminated as illustrated by the heavy dark line showing; while other street portions on the map remain dark, and at the same time the proper bus or street car designating numerals in the panel 14 will be illuminated as indicated at 27—28. Also, as indicated at 29—30, bus or street car designating numerals may be inscribed on certain street portions so as to be illuminated simultaneously therewith whenever the device is operated to indicate a street route as explained hereinabove. Preferably, the point at which the mechanism stands is prominently indicated on the map surface and is arranged to be always illuminated. As illustrated in Fig. 3, the device may also be arranged to enable the designation, for example, of an entire street as distinguished from some specific building or the like as mentioned hereinabove. In such case the user will consult the index means and then turn the wheel 20 to a position corresponding for example to "Elm Street"; and then upon operation of the mechanism the entire length of Elm Street will be illuminated as well as the shortest and best route from the starting point to intersect Elm Street.

To effect the desired illumination of the route and designating indicia as explained hereinabove, it is of course contemplated that any suitable illumination means may be employed behind the map surface. For example, incandescent lamp bulbs may be arranged in rows under the street and highway illustrations and connected in series with an appropriate power source through switch devices as controlled by the position of the index wheel 20. Or, as shown in Fig. 4, tubular type lamps may be employed under the street or highway illustrations on the map surface; but it will of course be understood that any other preferred form of illumination means may be employed within the purview of this invention.

Thus, by way of an example, as shown in Fig. 4, "Oak Boulevard" and "Main Street" on the map surface of Fig. 2 are arranged to be illuminated by corresponding tube lamps 32—34, respectively. These tubes are electrically connected to contacts 35—36 respectively, for completion of their circuits to a power source 38 upon closing of a relay 40; the other ends of the tubes being connected to ground. Other contacts 41—42 of the relay 40 control energization of lamps under the bus designating panels 27—28. The relay 40 is arranged to be energized to close whenever the index wheel brush 21 which rotates with the index strip 20 is moved into such position that it corresponds to the selected index number at which time the brush finger 44 contacts the conductor 45 of the coil circuit of the relay 40 for operation of the relay controlling illumination of the desired route. Thus, for each position on the index strip 20 there will be furnished a separate conductor as indicated at 46—51 for control of other similar relay-operated circuits as shown for example in Fig. 4; whereby it will be understood that appropriate illumination of a variety of routes from the starting point to various other points on the map and the other information referred to will be attained simply by appropriate rotation of the index wheel knob 22. The illumination devices will preferably be enclosed within similarly shaped panel devices disposed behind the map surface, so that the illumination effects will be confined to the street or highway intended to be illuminated.

As stated hereinabove, it is contemplated that the machine of the invention may be coin-controlled if desired, and therefore it will be understood that any suitable coin control mechanism such as is readily available on the market may be applied and connected into the electrical control circuit of Fig. 4. Inasmuch as such devices are presently so well known, it is believed unnecessary to further complicate the present specification by including a detailed illustration and description thereof.

Instead of the relay-controlled system as illustrated and described, it will of course be understood that any other suitable control arrangement may be employed, such as an electronic control system. It is also contemplated that in addition to the operation as explained hereinabove, the machine may be arranged to dispense incidental to each route illumination operation, a printed card or paper or the like carrying a strip route map and guide information to direct the person from his present location to the desired destination. Such guide cards might be separately stacked inside the cabinet 12 and selectively dispensed as from chutes 52 upon operation of an appropriate dispenser control solenoid 54 (Fig. 4) which may be automatically operated upon illumination of the map or separately thereof by means of an individual control circuit.

Thus, it will be appreciated that the mechanism of the invention provides a device which is of particular utility and convenience for use for example in railroad stations, at highway intersections, and at other points to which travelers regularly arrive and require information as to the best route of travel therefrom to a variety of locations in the vicinity. Whereas, a variety of forms of directories have been previously devised such as show the relative geographical positions of various points of interest, the present invention goes much further than anything of which I am aware in the prior art and provides a fully selective and clear-cut visual indication of the best possible route to follow to the intended destination as well as a designation of the proper public transportation facilities to be employed. Thus, a stranger for example is furnished with the information which is really needed by him in order to complete his intended trip, and such as is not furnished by the devices of the prior art. It will of course be understood that whereas only one form of the invention has been shown and described in detail, it will be apparent to those skilled in the art that the invention is not so limited but that various changes may be made therein without departing from the spirit of the invention or the scope of the appended claims.

I claim:

1. In combination, a map, a plurality of travel route and corresponding transit means identifying representations on said map, an information panel, corresponding transit means indicia on said panel, and means for selectively visually differentiating said route and transit means identifying representations on said map and correlated corresponding indicia on said panel in response to actuation of a selective index control mechanism.

2. In a directory device, a map, representation of route segments thereon, first illuminating means for bringing into prominence a number of said segments to thereby define a route, transit means indicators on said route and transfer indicators on said route, an information panel, separate transit means indicators and transfer indicators on said panel, second illuminating means for bringing into prominence a number of said indicators of said panel, and control means for said first and second illuminating means whereby multi-segmented route means and transfer information is made visually available on the map and on the panel upon operation of said control in accordance with a single route designation, said control means including selective means adapted to dispense a strip route map printed with the route and transit and transfer information as designated.

3. In a directory device, a map, representation of route segments thereon, first illuminating means for bringing into prominence a number of said segments to thereby define a route, transit means indicators on said route and transfer indicators on said route, an information panel, separate transit means indicators and transfer indicators on said panel, second illuminating means for bringing into prominence a number of said indicators of said panel, and control means for said first and second illuminating means whereby multi-segmented route means and transfer information is made visually available on the map and on the panel upon operation of said control in accordance with a single route designation.

References Cited in the file of this patent
UNITED STATES PATENTS

| Number | Name | Date |
|---|---|---|
| 883,992 | Wentz | Apr. 7, 1908 |
| 1,219,230 | Blackmore | Mar. 13, 1917 |
| 2,204,315 | Levin | June 11, 1940 |
| 2,487,318 | Elliott | Nov. 8, 1949 |

FOREIGN PATENTS

| Number | Country | Date |
|---|---|---|
| 455,981 | Great Britain | Nov. 2, 1936 |
| 515,930 | Great Britain | Dec. 18, 1939 |